United States Patent
Lee et al.

(10) Patent No.: US 7,022,262 B2
(45) Date of Patent: Apr. 4, 2006

(54) YTTRIUM ALUMINUM GARNET POWDERS AND PROCESSING

(75) Inventors: HeeDong Lee, Centerville, OH (US); Tai-Il Mah, Centerville, OH (US); Triplicane A. Parthasarathy, Beavercreek, OH (US); Kristin A. Keller, Springboro, OH (US)

(73) Assignee: UES, Inc., Dayton, OH (US)

( * ) Notice: Subject to any disclaimer, the term of this patent is extended or adjusted under 35 U.S.C. 154(b) by 8 days.

(21) Appl. No.: 10/724,272

(22) Filed: Nov. 25, 2003

(65) Prior Publication Data

US 2004/0109808 A1    Jun. 10, 2004

(51) Int. Cl.
*C04B 35/44* (2006.01)

(52) U.S. Cl. .............................. 252/301.4 R; 501/152; 501/153; 423/263; 423/600; 264/666; 264/663; 264/664

(58) Field of Classification Search .............. 264/663, 264/666, 664; 501/152, 153; 252/301.4 R; 117/945; 423/263, 600

See application file for complete search history.

(56) References Cited

U.S. PATENT DOCUMENTS

| | | | | |
|---|---|---|---|---|
| 5,114,702 A | * | 5/1992 | Pederson et al. | ............ 423/639 |
| 5,484,750 A | * | 1/1996 | Greskovich et al. | .......... 501/86 |
| 6,200,918 B1 | | 3/2001 | Yanagitani et al. | |
| 6,409,938 B1 | | 6/2002 | Comanzo | |
| 6,447,937 B1 | | 9/2002 | Murakawa et al. | |
| 6,496,250 B1 | | 12/2002 | Duclos et al. | |
| 6,844,285 B1 | * | 1/2005 | Wei | ............................ 501/152 |
| 2002/0012791 A1 | | 1/2002 | Morita et al. | |

FOREIGN PATENT DOCUMENTS

| | | |
|---|---|---|
| JP | 10101334 | 4/1998 |
| JP | 10101411 | 4/1998 |
| JP | 10114519 | 5/1998 |

* cited by examiner

*Primary Examiner*—C. Melissa Koslow
(74) *Attorney, Agent, or Firm*—Dinsmore & Sshohl LLP

(57) ABSTRACT

Methods of producing doped and undoped yttrium aluminum garnet and yttrium aluminum perovskite containing powders and the powders produced thereby are provided. Additionally, methods of forming doped and undoped polycrystalline yttrium aluminum garnet having a mean grain size of between about 1 μm to about 3 μm and the yttrium aluminum garnet produced thereby are provided. The doped and undoped polycrystalline yttrium aluminum garnet may be formed by sintering a compact and subsequently hot isostatically pressing the compact.

47 Claims, No Drawings

YTTRIUM ALUMINUM GARNET POWDERS AND PROCESSING

BACKGROUND OF THE INVENTION

The present invention relates to yttrium aluminum garnet (YAG) and yttrium aluminum perovskite (YAP) containing powders and polycrystalline YAG. More particularly, the present invention relates to methods of producing YAG and YAP containing powders and transparent polycrystalline YAG and the powders and transparent YAG structures produced thereby. Additionally, the present invention relates to methods of producing doped YAG and YAP containing powders and doped transparent polycrystalline YAG and the doped powders and doped transparent polycrystalline YAG structures produced thereby.

YAG is a very attractive compound for high temperature structural applications. Additionally, YAG exhibits high efficiency of energy transfer and radiation damage resistance, and YAG is an attractive laser host material. High optical transparency is important for laser applications, and polycrystalline YAG may be suitable for such applications. Polycrystalline YAG is often fabricated under vacuum at high temperatures for prolonged annealing periods. Additionally, the processes used to fabricate the precursor powders for polycrystalline YAG can be laborious and costly.

Thus, there remains a need in the art for methods of fabricating YAG and YAP containing powders and polycrystalline YAG that allow for reduced processing times and reduced cost. Additionally, there remains a need in the art for YAG having improved properties.

SUMMARY OF THE INVENTION

In accordance with an embodiment of the present invention, a method of producing a powder is provided. The method comprises: combining at least one salt of aluminum with at least one salt of yttrium to form an aqueous mixture, wherein aluminum and yttrium are present at a mole ratio of 3:5 yttrium to aluminum in the mixture; adding at least one reducing agent and at least one auxiliary oxidizing agent to the mixture; heating the mixture to a first temperature after adding the at least one reducing agent and the at least one auxiliary oxidizing agent such that the mixture undergoes combustion and a powder is formed; and calcining the powder at temperatures between about 700° C. to about 1000° C. until the powder comprises single phase cubic yttrium aluminum garnet.

In accordance with another embodiment of the present invention, a method of producing a powder is provided. The method comprises: combining at least one oxide of aluminum with at least one salt of yttrium to form an aqueous mixture, wherein the aluminum and the yttrium are present at a mole ratio of 3:5 aluminum to yttrium in the mixture; adding at least one reducing agent to the mixture; heating the mixture to a first temperature after adding the at least one reducing agent such that the mixture undergoes partial combustion and a powder is formed; calcining the powder at a first temperature range; and calcining the powder at a second temperature range until at least some of the powder comprises a yttrium aluminum perovskite phase, wherein the first temperature range is lower than the second temperature range, and wherein the second temperature range comprises between about 700° C. to about 1000° C.

In accordance with yet another embodiment of the present invention, a method of producing polycrystalline yttrium aluminum garnet is provided. The method comprises: providing a compact comprising at least one powder selected from undoped yttrium aluminum garnet, doped yttrium aluminum garnet, undoped yttrium aluminum perovskite, and doped yttrium aluminum perovakite; sintering the compact in flowing oxygen at temperatures of between about 1600° C. to about 1650° C. such that sintered yttrium aluminum garnet is formed; and hot isostatically pressing the sintered yttrium aluminum garnet at temperatures of between about 1500° C. to about 1550° C. and at a pressure between about 25 kpsi to about 30 kpsi such that a transparent polycrystalline yttrium aluminum garnet is formed having a mean grain size between about 1 µm to about 3 µm.

In accordance with an embodiment of the present invention, a ceramic materiol is provided. The ceramic material comprises a yttrium aluminum garnet material. The material is transparent to visible light. The material is polycrystalline, and the material has a mean grain between about 1 µm to about 3 µm.

DETAILED DESCRIPTION OF THE PREFERRED EMBODIMENTS

In accordance with an embodiment of the present invention, a method of producing a powder is provided. The method comprises combining at least one salt of aluminum (Al) with at least one salt of yttrium (Y) to form an aqueous mixture. The Al and Y are present at a mole ratio of 3:5 Y to Al in the mixture. The method further comprises adding at least one reducing agent and at least one auxiliary oxidizing agent to the mixture and heating the mixture to a first temperature such that the mixture undergoes combustion and a powder is formed. The method further comprises calcining the powder at temperatures between about 700° C. to about 1000° C. until said powder comprises single phase cubic yttrium aluminum garnet (YAG). For purposes of defining and describing the present invention, undoped YAG shall be understood as referring to $Y_3Al_5O_{12}$.

Any suitable salt of Al may be used, singularly or in combination with other Al salts. For example, the Al salt may comprise an aluminum nitrate salt such as $Al(NO_3)_3 \cdot 9H_2O$, an aluminum perchlorate, an aluminum sulfate salt, and combinations thereof. Any suitable salt of Y may be used, singularly or in combination with other Y salts. For example, a Y salt may comprise an yttrium nitrate salt such as $Y(NO_3)_3 \cdot 6H_2O$, an yttrium perchlorate, and an yttrium sulfate salt and combinations thereof. The Al salt and Y salt may be dissolved in de-ionized water to form the aqueous mixture.

Any suitable reducing and oxidizing agents may be used and added to the aqueous mixture in any suitable manner. For example, the aqueous mixture comprises at least one reducing agent such as alanine, and at least one auxiliary oxidizing agent such as ammonium nitrate. The alanine may comprise β-alanine, DL-alanine, or combinations thereof. The total moles of the reducing agent and the auxiliary oxidizing agent maybe between about 1.4 to about 1.5 times the total moles of the Al salt plus the Y salt. For example, the total moles of the reducing and auxiliary oxidizing agent may be about 1.48 times the total moles of the Al salt plus the Y salt. When the reducing and auxiliary oxidizing agents comprise alanine and ammonium nitrate, the mole ratio of ammonium nitrate to alanine may be between about 1.4 to about 1.5. For example, the mole ratio may be about 1.49. The reducing and auxiliary oxidizing agents may be added to the aqueous mixture and completely dissolved by vigorous stirring. The mixture may then be heated to remove the water from the mixture. For example the mixture may be heated to about 110° C. for about 2 to about 3 hours.

The mixture is heated to a first temperature such that the mixture undergoes combustion and a powder is formed. The first temperature may be between about 220° C. to about 250° C. The combustion generally results in a large volume expansion and the production of a powder. The powder may comprise an amorphous phase YAG, and the phase may be determined by utilizing X-ray powder diffraction. The primary particle size may be between about 30 to about 50 nm. The primary particle size may be measured using scanning electron microscopy.

After the powder is formed, it may be de-agglomerated prior to the calcination step. For example, the powder may be de-agglomerated by milling in a polyethylene bottle with ethyl alcohol using alumina balls having a purity of greater then 99.9% at 20 r.p.m. for about 24 hours. The powder may then be subsequently dried.

The powder is calcined in air at temperatures between about 700° C. to about 1000° C. The powder may be calcined in an alumina crucible. The powder may be calcined for any suitable period. For example, the powder may be calcined for about two hours with a 10° C./minute rate of heating and cooling. The powder is generally calcined until said powder comprises single phase cubic YAG. For example, the powder may comprise cubic YAG as the major phase after being calcined to 700° C., and the powder may be completely transformed to single phase cubic YAG after being calcined to 1000° C. The single phase cubic YAG generally has a primary particle size of between about 30 to about 60 nm. The particle size may be measured by transmission electron microscopy (TEM) or by a high resolution scanning electron microscopy (HRSEM). For example, the single phase cubic YAG may have a primary particle size of about 50 nm.

In accordance with another aspect of the present invention, a method of producing a powder is provided. The method comprises combining at least one oxide of aluminum with at least of salt of yttrium to form an aqueous mixture. The Al and Y are present at a mole ratio of 3:5 Y to Al in the mixture. The method further comprises adding at least one reducing agent to the mixture and heating the mixture to a first temperature such that the mixture undergoes partial combustion and a powder is formed. The method further comprises calcining the powder at a first temperature range and subsequently calcining the powder at a second temperature range until at least some of said powder comprises a yttrium aluminum perovskite (YAP) phase. The first temperature range is lower than the second temperature range. The second temperature range comprises between about 700° C. to about 1000° C. For purposes of defining and describing the present invention, YAP shall be understood as referring to $YAlO_3$.

Any suitable oxide of Al may be used. For example, $\alpha$-$Al_2O_3$, $\gamma$-$Al_2O_3$, or mixtures thereof may be used. Any suitable salt of Y may be used. For example, a yttrium nitrate salt such as $Y(NO_3).6H_2O$, a yttrium perchlorate, and a yttrium sulfate salt may be used. The oxide of Al and the Y salt may be dissolved in de-ionized water to form the aqueous mixture.

Any suitable reducing agent may be used and added to the aqueous mixture in any suitable manner. For example, alanine, such as $\beta$-alanine and DL-alanine, may be used as a reducing agent. The reducing agent may be added such that the reducing agent is added in about a 0.9 to about a 1:1 mole ratio with the Y salt. The reducing agent may be added to the aqueous mixture and completely dissolved by vigorous stirring. The mixture may then be heated to remove the water from the mixture. For example the mixture may be gradually heated to about 110° C. for between about 2 to about 3 hours, and the mixture may be further dried in an oven at about 100° C. for about 24 hours.

The mixture is heated to a first temperature such that the mixture undergoes partial combustion and a powder is formed. The first temperature may be about 200° C. to about 220° C. The partial combustion generally results in a large volume expansion and the production of a powder. The powder may be dispersed in ethyl alcohol with an ultrasonic bath, and the powder may be subsequently dried.

The powder is calcined at a first temperature range. The first temperature range may be 600° C. with a about a 5° C. to about a 10° C./minute rate of heating and cooling. The powder may be de-agglomerated after the calcining at the first temperature range. For example, the powder may be de-agglomerated by milling in a polyethylene bottle with ethyl alcohol using alumina balls having a purity of greater than 99.9% at 20 r.p.m. for about 24 hours. The powder may then be subsequently dried.

The powder is calcined at a second temperature range in air, and the second temperature range is higher than the first temperature range. The second temperature range is generally between about 700° C. to about 1000° C. At least some of the powder comprises a YAP phase. The primary particle size is between about 30 nm to about 60 nm. The powder may comprise YAP, $\alpha$-$Al_2O_3$ or $\gamma$-$Al_2O_3$, and $Y_2O_3$ phases.

A doped powder may be formed in accordance with either of the preceding methods. In order to form a doped powder, a rare earth salt may be substituted for a portion of the yttrium salt such tat the ratio of rare earth plus yttrium to aluminum is 3:5. Any suitable rare earth element, or combination of rare earth elements may be used. For example, Nd, Yb, Sc, Pr, Eu, Er, and combinations thereof may be used. Any suitable rare earth salt may be used. For example, the rare earth salt may comprise neodymium nitrate, $Nd(NO_3)_3.6H_2O$, and the neodymium nitrate may be added such that neodymium substitutes for 2 atomic percent of the yttrium. Thus, the resulting doped YAG will have a stoichiometry of $(Nd_{0.02}Y_{0.98})_3Al_5O_{12}$. It will be understood that the rare earth salt may be substituted in any desired proportion to the Y. The mixtures are further processed as discussed above.

The undoped and doped single phase cubic YAG and YAP containing powders may be further processed in any suitable manner. For example, the powders may be subject to further powder processing to aid in engineering the surface of the particles to achieve uniform particle packing and appropriate green strength. In one example, the powders may be dispersed in ethyl alcohol and 0.5 weight percent tetraethyl orthosilicate (TEOS) may be added as a sintering aid. The suspension may be dried under stirring and then placed in a crucible and calcined at 600° C. in air for about 1 hour with 10° C./minute heating and cooling rates. After calcining, 3 weight percent polyethylene glycol (PEG) having a molecular weight distribution of between about 300 to about 600 may be added to the powder. The powder may then be ball milled in ethyl alcohol using a polyethylene bottle for 5 hours at less than 20 r.p.m. The powders may be dried, granulated using a 200 mesh nylon sieve, and stored.

In accordance with another embodiment of the present invention, a method of forming polycrystalline YAG is provided. The method comprises providing a compact comprising at least one powder selected from undoped YAG, doped YAG, a powder mixture having undoped YAP, and a powder mixture having doped YAP. The method further comprises sintering the compact in flowing oxygen at temperatures of between about 1600° C. to about 1650° C. such that sintered YAG is formed, and the method comprises hot isostatically pressing the sintered YAG at temperatures of between about 1500° C. to about 1550° C. at a pressure between about 25 kpsi to about 30 kpsi such that a transparent polycrystalline YAG having an average grain size between about 1 μm to about 3 μm is formed. For purposes of defining and describing the present invention, "transparent" shall be understood as referring to a YAG capable of transmitting light in the visible range of the spectrum. Additionally, the transparent YAG may be capable of transmitting light from the visible range to the mid-IR (about 5.5 μm) range of the spectrum.

Generally, the powder in the compact is a powder prepared in accordance with the methods as discussed above. The compact may be prepared in accordance with any suitable method. The compact may be formed by unidirectionally cold pressing the granulated powder using a metal die under 2 kg/cm$^2$ pressure. The green compact may then be vacuum bagged and cold isostatically pressed at 40 kpsi of hydrostatic pressure. In another example, the compact may be formed by using suitable slip casting methods. For example, a slurry may be prepared by ball milling the calcined powder in de-ionized water after adding about 0.5% to about 1.0% of ammonium polyacrylate. The slurry may be slip cast using a gypsum mold or a porous membrane. After slip casting, the green compacts may be dried in the ambient atmosphere for about 24 hours and then further dried in an oven at about 100° C.

The compacts may be further processed to burn out the binder in any suitable manner. For example, the compacts may be placed on alumina substrates and heated in a box furnace to 700° C. in air with a slow heating rate of between about 0.5 to about 1.0° C./minute and a 10 minute hold at the peak temperature. The compacts may then be cooled to room temperature at 10° C./minute. It will be understood that the compacts may be prepared in accordance with any suitable process prior to sintering and hot isostatic pressing.

The compacts may be sintered any suitable manner. For example, the compacts may be sintered in an alumina container in an alumina tube muffle furnace. The compacts may be sintered for any suitable time. For example, the compacts may be sintered for a holding period of between about 5 hours to about 10 hours. The compacts may be sintered such that the heating and cooling rates are about 5° C. to about 10° C./minute. Generally, the sintered YAG has a density of between about 95.0% to about 99.5% of the theoretical density of the compact after sintering. The density may be estimated by the Archimedes method after boiling the compacts in de-ionized water. The density of undoped YAG is 4.55 g/cm$^3$. Additionally, the compacts may have an open porosity of between about 0.5 volume percent and about 5.0 volume percent.

The sintered YAG may be hot isostatically pressed in any suitable manner for any suitable length of time. For example, the sintered YAG may be hot isostatically pressed at a pressure of 30 kpsi for between about 5 hours to about 10 hours. High purity argon may be used as a pressure medium. The surface of the compact may be polished after the compact is hot isostatically pressed. For example, the surface of the compact may be polished using a 1 μm diamond slurry.

The resulting YAG generally comprises a transparent polycrystalline YAG having a mean grain size between about 1 μm to about 3 μm. It will be understood that the transparent polycrystalline YAG may be doped or undoped. The transparent polycrystalline YAG generally has high mechanical strength due to the uniformity of the microstructure. Additionally, the transparent polycrystalline YAG exhibits high optical transmittance. Thus, the transparent polycrystalline YAG of the present invention may be used in a variety of applications including, but not limited to, laser windows, high power laser hosts, IR windows, and missile domes.

Unless otherwise indicated, all numbers expressing quantities of ingredients, properties such as molecular weight, reaction conditions, and so forth as used in the specification and claims are to be understood as being modified in all instances by the term "about." Accordingly, unless otherwise indicated, the numerical properties set forth in the following specification and claims are approximations that may vary depending on the desired properties sought to be obtained in embodiments of the present invention.

It will be obvious to those skilled in the art that various changes may be made without departing from the scope of the invention, which is not to be considered limited to what is described in the specification.

The invention claimed is:

1. A method of producing a powder, comprising:
combining at least one salt of aluminum with at least one salt of yttrium;
dissolving said at least one salt of aluminum and said at least one salt of yttrium in water to form an aqueous mixture, wherein aluminum and yttrium are present at a mole ratio of 3:5 yttrium to aluminum in said mixture;
adding at least one reducing agent and at least one auxiliary oxidizing agent to said mixture;
heating said mixture to a first temperature after adding said at least one reducing agent and said at least one auxiliary oxidizing agent such that said mixture undergoes combustion and a powder is formed; and
calcining said powder at temperatures between about 800° C. to about 1000° C. for an amount of time sufficient to form single phase cubic yttrium aluminum garnet.

2. The method as claimed in claim 1 wherein said at least one salt of aluminum comprises an aluminum nitrate.

3. The method as claimed in claim 1 wherein said at least one salt of aluminum comprises an aluminum perchlorate.

4. The method as claimed in claim 1 wherein said at least one salt of aluminum comprises an aluminum sulfate.

5. The method as claimed in claim 1 wherein said at least one salt of yttrium comprises a yttrium nitrate.

6. The method as claimed in claim 1 wherein said at least one salt of yttrium comprises a yttrium sulfate.

7. The method as claimed in claim 1 wherein said at least one salt of yttrium comprises a yttrium perchlorate.

8. The method as claimed in claim 1 wherein said at least one salt of aluminum comprises an aluminum nitrate, and wherein said at least one salt of yttrium comprises a yttrium nitrate.

9. The method as claimed in claim 8 wherein said aluminum nitrate comprises $Al(NO_3)_3.9H_2O$, and wherein said yttrium nitrate comprises $Y(NO_3).6H_2O$.

10. The method as claimed in claim 1 further comprising combining at least one salt of a rare earth element with said salt of aluminum and said salt of yttrium, wherein:
said rare earth element, said aluminum, and said yttrium are present at a mole ratio of 3:5 rare earth plus yttrium to aluminum; and
said powder comprises a singe phase cubic doped yttrium aluminum garnet after said calcining.

11. The method as claimed in claim 10 wherein said rare earth element is selected from Nd, Yb, Sc, Pr, Eu, and Er and combinations thereof.

12. The method as claimed in claim 1 wherein said at least one reducing agent comprises alanine.

13. The method as claimed in claim 12 wherein said alanine comprises β-alanine and DL-alanine.

14. The method as claimed in claim 1 wherein said at least on auxiliary oxidizing agent comprises ammonium nitrate.

15. The method as claimed in claim 1 wherein the total moles of said at least one reducing agent and said at least one auxiliary oxidizing agent is equal to between about 1.4 to about 1.5 times the total moles of said aluminum salt plus said yttrium salt.

16. The method as claimed in claim 1 wherein said mixture is heated after adding said at least one reducing agent and said at least one auxiliary oxidizing agent to remove the water prior to said combustion of said mixture.

17. The method as claimed in claim 1 wherein said first temperature is between about 220° C. to about 250° C.

18. The method as claimed in claim 1 wherein said powder is de-agglomerated prior to said calcining.

19. The method as claimed in claim 1 wherein said powder comprising said single phase cubic yttrium aluminum garnet has a primary particle size between about 30 nm to about 60 nm.

20. The method as claimed in claim 18 wherein said powder has a primary particle size of about 50 nm.

21. A method of producing a powder, comprising:
combining at least one oxide of aluminum with at least one salt of yttrium;
dissolving said at least one salt of aluminum and said at least one salt of yttrium in water to form an aqueous mixture, wherein said aluminum and said yttrium are present at a mole ratio of 3:5 aluminum to yttrium in said mixture;
adding at least one reducing agent to said mixture;
heating said mixture to a first temperature after adding said at least one reducing agent such that said mixture undergoes partial combustion and a powder is formed;
calcining said powder at a first temperature range; and
calcining said powder at a second temperature range until at least some of said powder comprises a yttrium aluminum perovskite phase, wherein said first temperature range is lower than said second temperature range, and wherein said second temperature range comprises between about 700° C. to about 1000° C.

22. The method as claimed in claim 21 wherein said oxide of aluminum is selected from the group consisting of α-Al$_2$O$_3$, γ-Al$_2$O$_3$, and combinations thereof.

23. The method as claimed in claim 21 wherein said salt of yttrium comprises a yttrium nitrate.

24. The method as claimed in claim 21 wherein said salt of yttrium comprises a yttrium sulfate.

25. The method as claimed in claim 21 wherein said salt of yttrium comprises a yttrium perchlorate.

26. The method as claimed in claim 21 further comprising combining at least one salt of a rare earth element with said oxide of aluminum and said salt of yttrium, wherein:
said rare earth element, said aluminum, and said yttrium are present at a mole ratio of 3:5 rare earth plus yttrium to aluminum; and
at least some of said powder comprises a doped yttrium aluminum perovskite phase after said calcining at said second temperature.

27. The method as claimed in claim 26 wherein said rare earth element is selected from Nd, Yb, Sc, Pr, Eu, and Er and combinations thereof.

28. The method as claimed in claim 21 wherein said at least one reducing agent is selected from α-alanine, DL-alanine, and combinations thereof.

29. The method as claimed in claim 21 wherein said at least one reducing agent comprises between about a 1 to about a 0.9:1 mole ratio with said salt of yttrium.

30. The method as claimed in claim 21 wherein said mixture is heated after adding said at least one reducing agent to remove the water prior said partial combustion.

31. The method as claimed in claim 21 wherein said first temperature is between about 200° C. to about 220° C.

32. The method as claimed in claim 21 wherein said powder is dispersed in ethyl alcohol prior to said calcining at said first temperature range.

33. The method as claimed in claim 21 wherein said first temperature range is about 600° C.

34. The method as claimed in claim 21 wherein said second temperature range is between about 700° C. to about 1000° C.

35. The method as claimed in claim 21 wherein said powder is de-agglomerated by milling prior to calcining at said second temperature range.

36. The method as claimed in claim 21 wherein said powder comprises yttrium aluminum perovskite, α-Al$_2$O$_3$ or γ-Al$_2$O$_3$, and Y$_2$O$_3$ phases after said calcining at said second temperature range.

37. The method as claimed in claim 36 wherein said powder comprising yttrium aluminum perovskite has a primary particle size between about 30 nm to about 60 nm.

38. A method of producing polycrystalline yttrium aluminum garnet, comprising:
providing a compact comprising at least one powder selected from undoped yttrium aluminum garnet, doped yttrium aluminum garnet, undoped yttrium aluminum perovskite, and doped yttrium aluminum perovskite;
sintering said compact in flowing oxygen at temperatures of between about 1600° C. to about 1650° C. for a holding period of between about 5 hours to about 10 hours such that sintered yttrium aluminum garnet is formed; and
hot isostatically pressing said sintered yttrium aluminum garnet at temperatures of between about 1500° C. to about 1550° C. and at a pressure between about 25 kpsi to about 30 kpsi such that a transparent polycrystalline yttrium aluminum garnet is formed having a mean grain size between about 1 μm to about 3 μm.

39. The method as claimed in claim 38 wherein said compact is sintered such that said compact is heated and cooled at a rate of about 5° C./minute to about 10° C./minute.

40. The method as claimed in claim 38 wherein said compact has a density of between about 95.0% to about 99.5% of the theoretical density of said compact after said sintering.

41. The method as claimed in claim 38 wherein said compact is hot isostatically pressed for between about 5 hours to about 10 hours.

42. The method as claimed in claim 38 wherein said compact is hot isostatically pressed at a pressure of about 30 kpsi.

43. The method as claimed in claim 38 wherein said compact is hot isostatically pressed using high purity argon.

44. The method as claimed in claim 38 wherein the surface of said compact is polished using a diamond slurry after said compact is hot isostatically pressed.

45. A method of producing polycrystalline yttrium aluminum garnet comprising:
- combining at least one salt of aluminum with at least one salt of yttrium;
- dissolving said at least one salt of aluminum with said at least one salt of yttrium to form an aqueous mixture, wherein aluminum and yttrium are present at a mole ratio of 3:5 yttrium to aluminum in said mixture;
- adding at least one reducing agent and at least one auxiliary oxidizing agent to said mixture;
- heating said mixture to a first temperature after adding said at least one reducing agent and said at least one auxiliary oxidizing agent such that said mixture undergoes combustion and a powder is formed;
- calcining said powder at temperatures between about 800° C. to about 1000° C. for an amount of time sufficient to form single phase cubic yttrium aluminum garnet;
- forming a compact from said single phase cubic yttrium aluminum garnet powder;
- sintering said compact in flowing oxygen at temperatures of between about 1600° C. to about 1650° C. such that sintered yttrium aluminum garnet is formed; and
- hot isostatically pressing said sintered yttrium aluminum garnet at temperatures of between about 1500° C. to about 1550° C. and at a pressure between about 25 kpsi to about 30 kpsi such that a transparent polycrystalline yttrium aluminum garnet is formed having a mean grain size between about 1 μm to about 3 μm.

46. A method of producing polycrystalline yttrium aluminum garnet comprising:
- combining at least one oxide of aluminum with at least one salt of yttrium;
- dissolving said at least one salt of aluminum with said at least one salt of yttrium to form an aqueous mixture, wherein said aluminum and said yttrium are present at a mole ratio of 3:5 aluminum to yttrium in said mixture;
- adding at least one reducing agent to said mixture;
- heating said mixture to a first temperature after adding said at least one reducing agent such that said mixture undergoes partial combustion and a powder is formed;
- calcining said powder at a first temperature range;
- calcining said powder at a second temperature range until at least some of said powder comprises a yttrium aluminum perovskite phase, wherein said first temperature range is lower than said second temperature range, and wherein said second temperature range comprises between about 700° C. to about 1000° C.;
- forming a compact from said powder comprising at least a yttrium aluminum perovskite phase;
- sintering said compact in flowing oxygen at temperatures of between about 1600° C. to about 1650° C. such that sintered yttrium aluminum garnet is formed; and
- hot isostatically pressing said sintered yttrium aluminum garnet at temperatures of between about 1500° C. to about 1550° C. and at a pressure between about 25 kpsi to about 30 kpsi such that a transparent polycrystalline yttrium aluminum garnet is formed having a mean grain size between about 1 μm to about 3 μm.

47. The method as claimed in claim 1 wherein the auxiliary oxidizing agent comprises ammonium nitrate, the reducing agent comprises alanine, and a mole ratio of aluminum nitrate to alanine is equal to between about 1.4 to about 1.5.

* * * * *

UNITED STATES PATENT AND TRADEMARK OFFICE
CERTIFICATE OF CORRECTION

PATENT NO. : 7,022,262 B2 Page 1 of 1
APPLICATION NO. : 10/724272
DATED : January 26, 2006
INVENTOR(S) : Lee et al.

It is certified that error appears in the above-identified patent and that said Letters Patent is hereby corrected as shown below:

Col. 6, line 58 "Al(NO$_3$)$_3$.9H$_2$O" should read --Al(NO$_3$)$_3$·9H$_2$O--;

Col. 6, line 59 "Y(NO$_3$).6H$_2$O" should read --Y(NO$_3$)$_3$·6H$_2$O--;

Col. 7, line 9 "on" should read --one--;

Col. 8, line 5 "α-alanine," should read --β-alanine,--;

Col. 8, Line 9 "0.9:1" should read --0.9 : 1--; and

Col. 10, line 33 "aluminum" should read --ammonium--.

Signed and Sealed this

Fourteenth Day of November, 2006

JON W. DUDAS
*Director of the United States Patent and Trademark Office*

UNITED STATES PATENT AND TRADEMARK OFFICE
CERTIFICATE OF CORRECTION

PATENT NO. : 7,022,262 B2
APPLICATION NO. : 10/724272
DATED : April 4, 2006
INVENTOR(S) : Lee et al.

It is certified that error appears in the above-identified patent and that said Letters Patent is hereby corrected as shown below:

Col. 6, line 58 "$Al(NO_3)_3.9H_2O$" should read --$Al(NO_3)_3 \cdot 9H_2O$--;

Col. 6, line 59 "$Y(NO_3).6H_2O$" should read --$Y(NO_3)_3 \cdot 6H_2O$--;

Col. 7, line 9 "on" should read --one--;

Col. 8, line 5 "α-alanine," should read --β-alanine,--;

Col. 8, Line 9 "0.9:1" should read --0.9 : 1--; and

Col. 10, line 33 "aluminum" should read --ammonium--.

This certificate supersedes Certificate of Correction issued November 14, 2006.

Signed and Sealed this

Second Day of January, 2007

JON W. DUDAS
*Director of the United States Patent and Trademark Office*